(12) United States Patent
Thiagarajan

(10) Patent No.: US 8,578,469 B2
(45) Date of Patent: Nov. 5, 2013

(54) COMPUTER SYSTEM PROTECTION

(75) Inventor: Ashwin Thiagarajan, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1520 days.

(21) Appl. No.: 11/808,698

(22) Filed: Jun. 12, 2007

(65) Prior Publication Data
US 2008/0313725 A1 Dec. 18, 2008

(51) Int. Cl.
G06F 21/31 (2013.01)

(52) U.S. Cl.
USPC .................................. 726/16; 726/9

(58) Field of Classification Search
USPC .............. 726/16, 22, 17, 18, 20, 27, 35
See application file for complete search history.

(56) References Cited

U.S. PATENT DOCUMENTS

| 6,166,688 | A | * | 12/2000 | Cromer et al. | 342/357.74 |
| 6,954,147 | B1 | * | 10/2005 | Cromer et al. | 340/568.1 |
| 7,467,401 | B2 | * | 12/2008 | Cicchitto | 726/4 |
| 7,847,675 | B1 | * | 12/2010 | Thyen et al. | 340/5.2 |
| 2003/0115142 | A1 | * | 6/2003 | Brickell et al. | 705/51 |
| 2004/0059914 | A1 | * | 3/2004 | Karaoguz | 713/168 |
| 2004/0177272 | A1 | * | 9/2004 | Walters | 713/201 |
| 2005/0071168 | A1 | * | 3/2005 | Juang et al. | 704/273 |
| 2005/0091552 | A1 | | 4/2005 | Piccionelli et al. | |
| 2006/0037073 | A1 | * | 2/2006 | Juels et al. | 726/17 |
| 2006/0100951 | A1 | * | 5/2006 | Mylet et al. | 705/37 |
| 2006/0129504 | A1 | * | 6/2006 | Nakajima | 705/75 |
| 2006/0224887 | A1 | * | 10/2006 | Vesikivi et al. | 713/166 |

OTHER PUBLICATIONS

European Search Report for Application No. 08009211.7, Sep. 3, 2008, 3 pp.

* cited by examiner

Primary Examiner — Eleni Shiferaw
Assistant Examiner — Abu Sholeman
(74) Attorney, Agent, or Firm — Stern, Kessler, Goldstein & Fox P.L.L.C.

(57) ABSTRACT

Methods, systems, and computer program products for computer system protection are provided. Embodiments protect against unauthorized access to information on stolen and/or illegally transported computer systems. Embodiments include locking of functionalities within a computer system when the computer system moves outside a designated area. Embodiments include limiting access to functionalities within the computer system based on the location of the computer system. Embodiments of the present invention include allowing variable levels of access protection depending on the location of the computer system.

30 Claims, 9 Drawing Sheets

COMPUTER SYSTEM PROTECTION

BACKGROUND OF THE INVENTION

1. Field of the Invention

The present invention relates generally to computing security, and more particularly to increased access protection in computer systems.

2. Background Art

Information theft and illegal transportation is a challenging problem with large amounts of information to protect and the competing need to share information effectively.

One aspect of information theft includes the theft or illegal transportation of computer systems outside designated areas such as campuses or workplaces, for example. As these computer systems may contain personal, confidential, and/or classified information, computer access protection upon theft or illegal transportation is needed.

Current technology does not adequately address this serious problem. Indeed, save for mere operating system password protection, many computer systems lack protection from theft and/or illegal transportation.

Computer system protection methods, systems, and computer program products are therefore needed to protect against information theft from stolen and/or illegally transported computer systems.

BRIEF SUMMARY OF THE INVENTION

Methods, systems, and computer program products for computer system protection are provided herein.

Embodiments of the present invention protect against unauthorized access to information on stolen and/or illegally transported computer systems.

Embodiments of the present invention include methods, systems, and computer program products to detect when a computer system moves outside a designated area.

Embodiments of the present invention include methods, systems, and computer program products to trigger a second level of authentication when a computer system moves outside a designated area.

Embodiments of the present invention include methods, systems, and computer program products to lock functionalities within the computer system when the computer system moves outside a designated area.

Embodiments of the present invention include blocking access to one or more of the operating system, hard drives, and external drives of the computer system.

Embodiments of the present invention include methods, systems, and computer program products to allow limited access to functionalities within the computer system based on the location of the computer system. These functionalities may include one or more of printing documents, network access, and access to external drives.

Embodiments of the present invention include methods, systems, and computer program products to allow variable levels of access protection depending on the location of the computer system.

Embodiments of the present invention can be implemented using RF-based communication, InfraRed (IF)-based communication, and/or GPS-based communication.

Embodiments of the present invention function regardless of the power mode of the computer system upon its moving outside a designated area.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

Introduction

One aspect of information theft includes the theft or illegal transportation of computer systems outside designated areas. As these computer systems may contain personal, confidential, and/or classified information, computer access protection upon theft or illegal transportation is needed.

Methods, systems, and computer program products for computer system protection are provided herein.

Embodiments of the present invention protect against unauthorized access to information on stolen and/or illegally transported computer systems.

Embodiments of the present invention include methods, systems, and computer program products to detect when a computer system moves outside a designated area.

Embodiments of the present invention include methods, systems, and computer program products to trigger additional authentication when a computer system moves outside a designated area.

Embodiments of the present invention include methods, systems, and computer program products to lock of functionalities within the computer system when the computer system moves outside a designated area.

Embodiments of the present invention include blocking access to one or more of the operating system, hard drives, and external drives of the computer system.

Embodiments of the present invention include methods, systems, and computer program products to allow limited access to functionalities within the computer system based on the location of the computer system. These functionalities may include one or more of printing documents, network access, and access to external drives.

Embodiments of the present invention include methods, systems, and computer program products to allow variable levels of access protection depending on the location of the computer system.

Embodiments of the present invention can be implemented using Radio Frequency (RF)-based communication, or Infra-Red (IF)-based communication, and/or GPS-based communication.

Embodiments of the present invention function regardless of the power mode of the computer system upon its moving outside a designated area.

Detailed description of embodiments of the present invention will now be provided.

Computer System Protection

Figure 1:
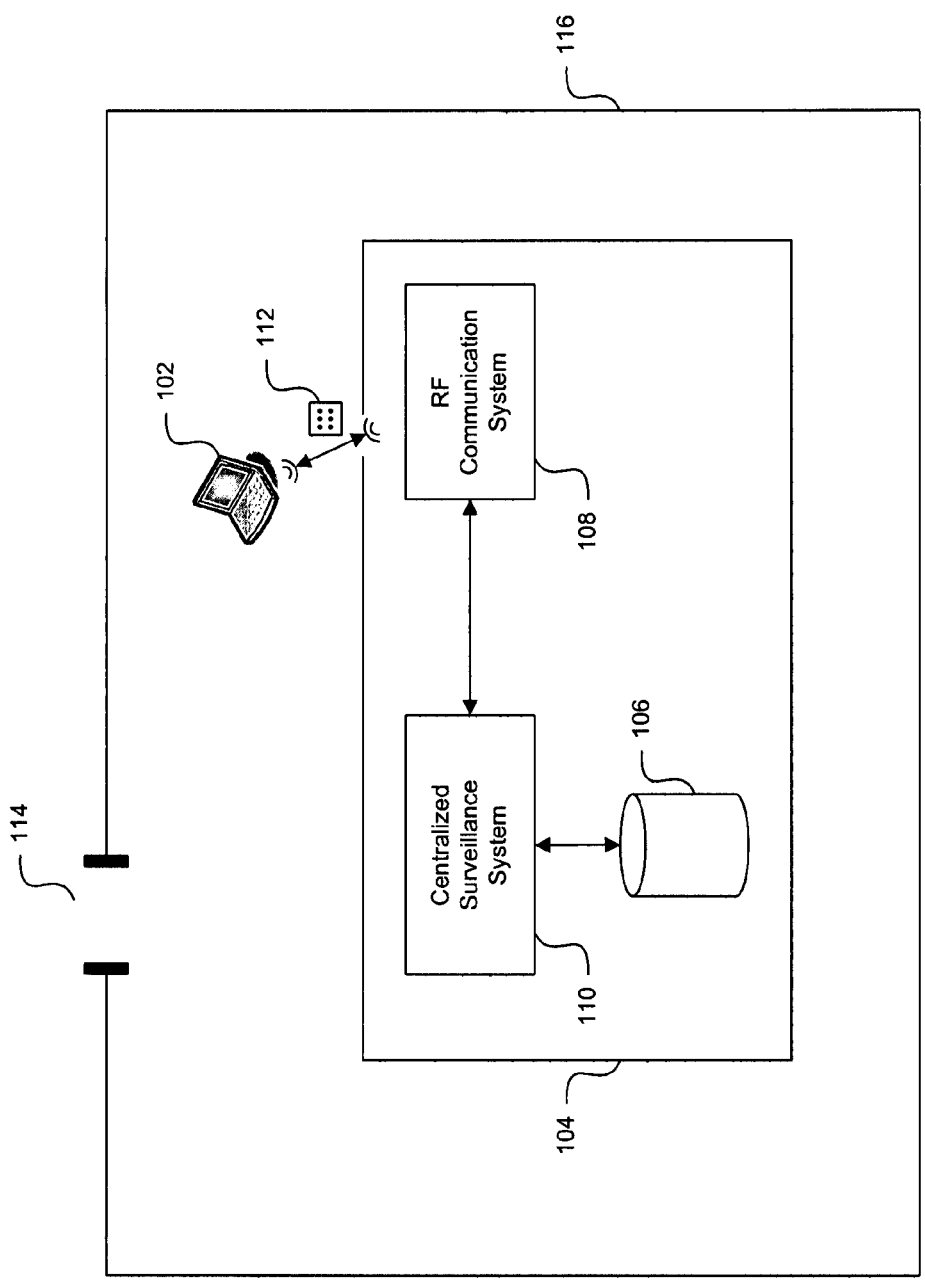
FIG. 1 is an example scenario that illustrates the operation of a computer access protection system.

FIG. 1 is an example scenario 100 of a computer access protection system. Example scenario 100 illustrates a computer system 102 and a computer access protection system 104, within a designated area 116. Designated area 116 may be any defined area, including, for example, a school, office building, multi-building corporate campus, house, hospital, police station, fire station, central office, power plant, or research facility.

Computer system 102 can be any commercially available and/or well known computer capable of performing the functions described herein. In an embodiment, computer system 102 is a laptop computer. Computer system 102 has a first level of authentication that is carried out both within and outside designated area 116. For example, this first level of authentication includes performing an operating system authentication function.

Computer access protection system 104 is a communication and control system configured to control access to computer system 102 based on the location of computer system 102. In example scenario 100, computer access protection system 104 is illustrated as positioned within designated area 116. Embodiments of the present invention are not limited to this embodiment. As would be understood by a person skilled in the art based on the teachings herein, computer access protection system 104 can be located fully or partially within or outside designated area 116.

In example 100, computer access protection system 104 includes a centralized surveillance system 110, a database 106, and a radio frequency (RF) communication system 108. In other embodiments, one or more subsystems of computer access protection system 104 may be integrated to form other subsystems.

Figure 2:
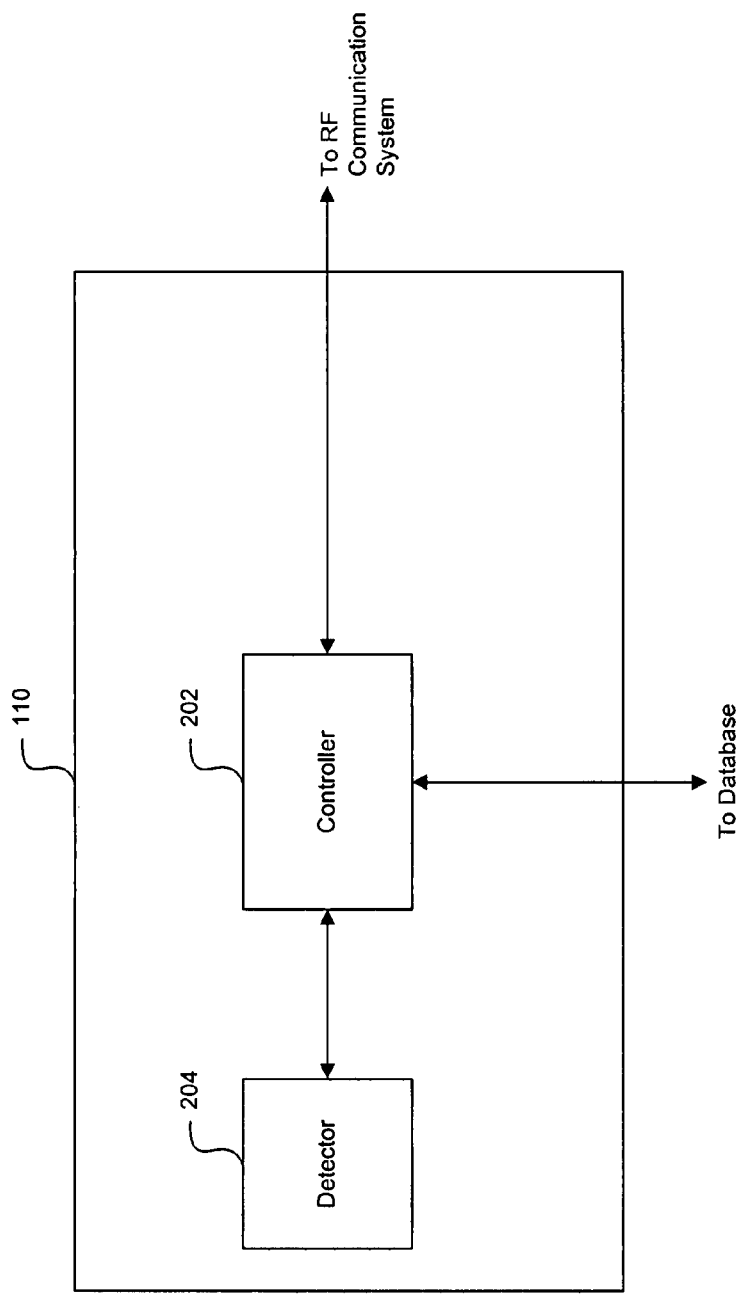
FIG. 2 illustrates an example centralized surveillance system.

Centralized surveillance system 110 is configured to detect when computer system 102 moves outside designated area 116. In an embodiment, as illustrated in FIG. 2, centralized surveillance system 110 includes a controller 202 and a detector 204.

Controller 202 controls the operation of one or more subsystems of computer access protection system 104. In an embodiment, controller 202 communicates with detector 204 to configure detector 204 to detect computer system 102 and/or to receive detection signals from detector 204. Controller 202 also communicates with database 106 and RF communication system 108 of computer access protection system 104.

In an embodiment, computer system 102 registers with computer access protection system 104, which causes authentication information associated with a legitimate user of computer system 102 to be generated and stored in database 106. In addition, registration may associate a detection code with computer system 102.

Centralized surveillance system 110, through controller 202, may access database 106 to retrieve the detection code associated with computer system 102 and may use the detection code to configure detector 204 to detect computer system 102. In an embodiment, detector 204 is configured to generate and transmit detection signals to controller 202 when computer system 102 moves outside designated area 116. For example, detector 204 may be positioned at an exit gate 114 of designated area 116 so as to detect computer system 102 exiting designated area 116. Other techniques to detect when computer system 102 moves outside designated area 116 may also be used as would be understood by a person skilled in the art based on the teachings herein.

In an embodiment, upon receiving a detection signal from detector 204 indicating that computer system 102 is moving outside designated area 116, controller 202 communicates with database 106 to generate and/or retrieve authentication information associated with computer system 102. Controller 202 then communicates with RF communication system 108 to wirelessly convey a token 112 to computer system 102. Token 112 includes authentication information associated with the legitimate user of computer system 102 and is used to trigger a second level of authentication when computer system 102 is subsequently started outside designated area 116.

In another embodiment, centralized surveillance system 110 conveys token 112 to computer system 102 when computer system 102 is within designated area 116 and activates the token when computer system 102 moves outside designated area 116.

Database 106 of computer access protection system 104 can be any storage system capable of performing the database functions described herein. Database 106 may be located proximately or remotely with respect to centralized surveillance system 110 and/or RF communication system 108. In an embodiment, database 106 stores authentication information associated with legitimate users of computer systems, such as computer system 102, registered with computer access protection system 104. Further example embodiments of database 106 are provided below in FIG. 6.

RF communication system 108 of computer access protection system 104 can be any RF communication system capable of performing the wireless communication functions described herein. For example, RF communication system 108 may be a wireless radio transceiver in embodiments using two-way communication with computer system 102. Alternatively, RF communication system 108 may be a wireless radio transmitter in embodiments using one-way communication with computer system 102. In other embodiments (not illustrated in FIG. 1), RF communication system 108 may be replaced with an Infra-Red (IR) and/or a dual RF/IR communication system. As would be understood by a person skilled in the art based on the teachings herein, RF communication system 108 can be located within or outside designated area 116, as long as it is reliably able to communicate with computer system 102.

Figure 3:
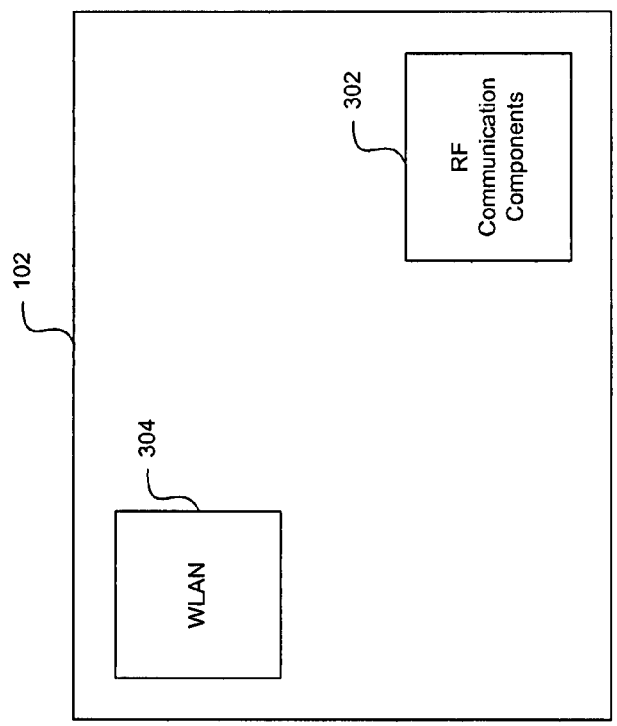
FIG. 3 illustrates an example computer system configured to function within the system of FIG. 1.

As described above, computer system 102 can be any commercially available and/or well known computer capable of performing the functions described herein, including a laptop computer. In an embodiment 300, illustrated in FIG. 3, computer system 102 includes RF communication components 302, which are used to communicate with RF communication system 108 of computer access protection system 104. For example, RF communication components 302 may include a wireless RF transceiver or a wireless RF receiver. In other embodiments (not illustrated in FIG. 3), RF communication components 302 may be replaced with IR communication components and/or dual RF/IF communication components.

Figure 4:
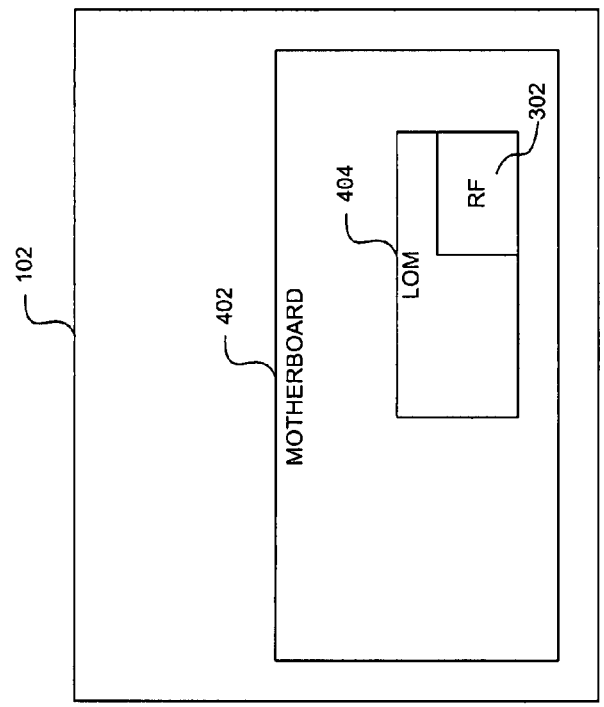
FIG. 4 illustrates an example computer system configured to function within the system of FIG. 1.

RF communication components 302 are distinct from wireless local area network (WLAN) components 304, which may also be available within computer system 304. RF communication components 302 may be integrated within existing hardware components of computer system 102 or as independent components. In an embodiment 400, illustrated in FIG. 4, RF communication components 302 are integrated within a LAN On Motherboard (LOM) network adapter 404 of computer system 102. LOM network adapter 404 is typically integrated within a motherboard 402 of computer system 102.

Access protection for computer system 102 will be enabled when computer system 102 moves outside designated area 116, regardless of the power mode that computer system 102 may be in at the time of its moving outside designated area 116. For example, computer system 102 may be ON, OFF, in Standby mode, or in Hibernation/Sleep mode at the time of its moving outside designated area 116. As such, RF communication components 302 will need to communicate with computer access protection system 104, regardless of the power mode of computer system 102, and, consequently, require some form of power supply at all times.

One advantage therefore of embodiment 400 includes eliminating the need for additional power supply circuitry to provide continuous power to RF communication components 302. This is because, by integrating RF communication components 302 within LOM network adapter 404, RF communication components 302 would benefit from the fact that LOM network adapter 404 generally receives power at all times from the battery of computer system 302. This is typically the case in order to enable a Wake On LAN feature of LOM network adapter 404 for remotely waking up computer system 102.

Figure 5:
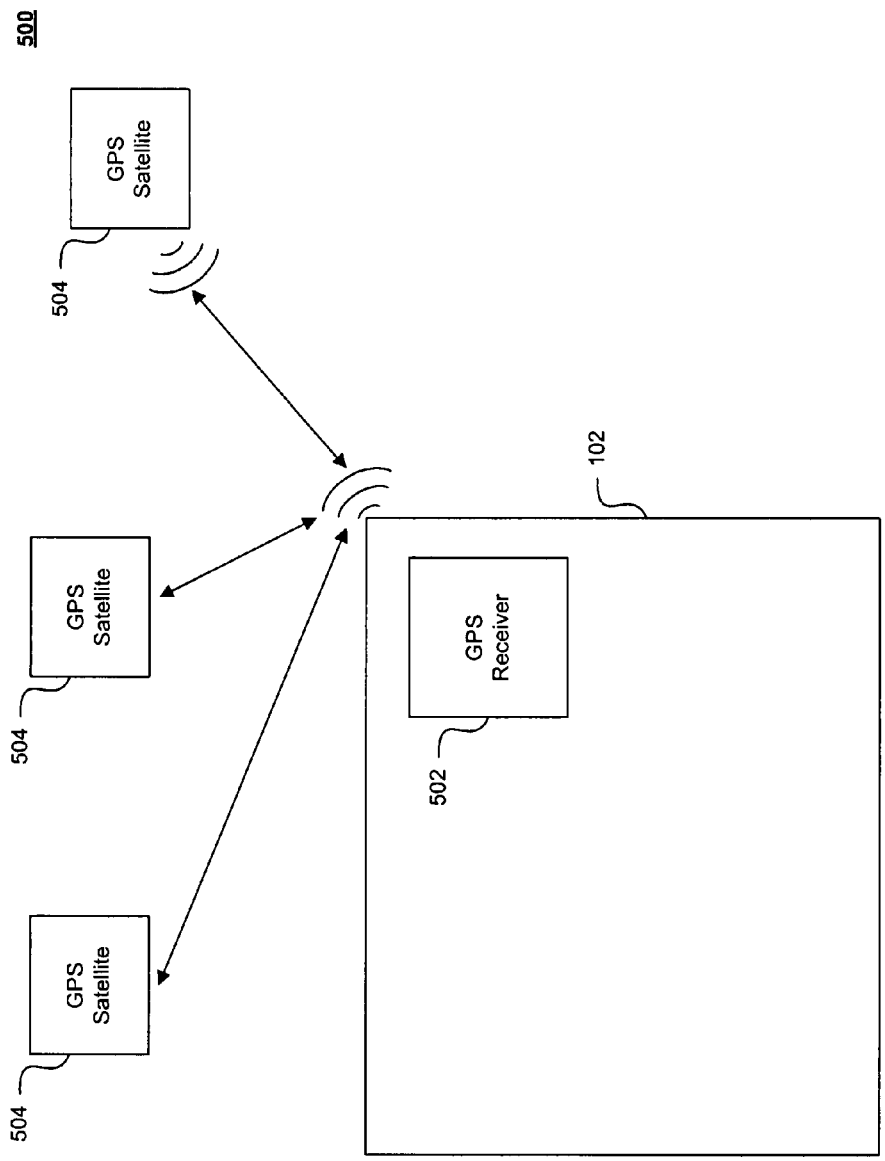
FIG. 5 illustrates an example computer system configured to function within a GPS-based computer access protection system.

FIG. 5 illustrates another example embodiment 500 of computer system 102, which may be used in a GPS-based computer access protection system.

According to this embodiment, computer access protection is not limited to securing computer system 102 based on its location with respect to a designated area but can be extended to enable additional or a second level of authentication based on global positioning information of computer system 102. For example, using a token similar to token 112 of FIG. 1, the computer access protection system can trigger additional or a second level authentication when computer system 102 moves outside and/or inside one or more designated areas. The designated areas may be defined using one or more ranges of global positioning coordinates.

To enable GPS-based computer access protection, computer system 102 may include a GPS receiver 502. GPS receiver 502 receives signals from a plurality of satellite systems 504 and generates global positioning coordinates of computer system 102. When computer system 102 is started, the generated global positioning coordinates are compared against the one or more designated areas included in the token and corresponding levels of protection are accordingly enabled. As would be appreciated by a person skilled in the art based on the teachings herein, one or more levels of computer access protection (having different levels of access to and/or blocking of functionalities) can be used depending on within which of the one or more designated areas computer system 102 is.

In an alternative embodiment, when computer system 102 is started, computer system 120 compares the generated global positioning coordinates against one or more designated areas to decide whether or not to download a token, which enables the added computer protection.

Figure 6:
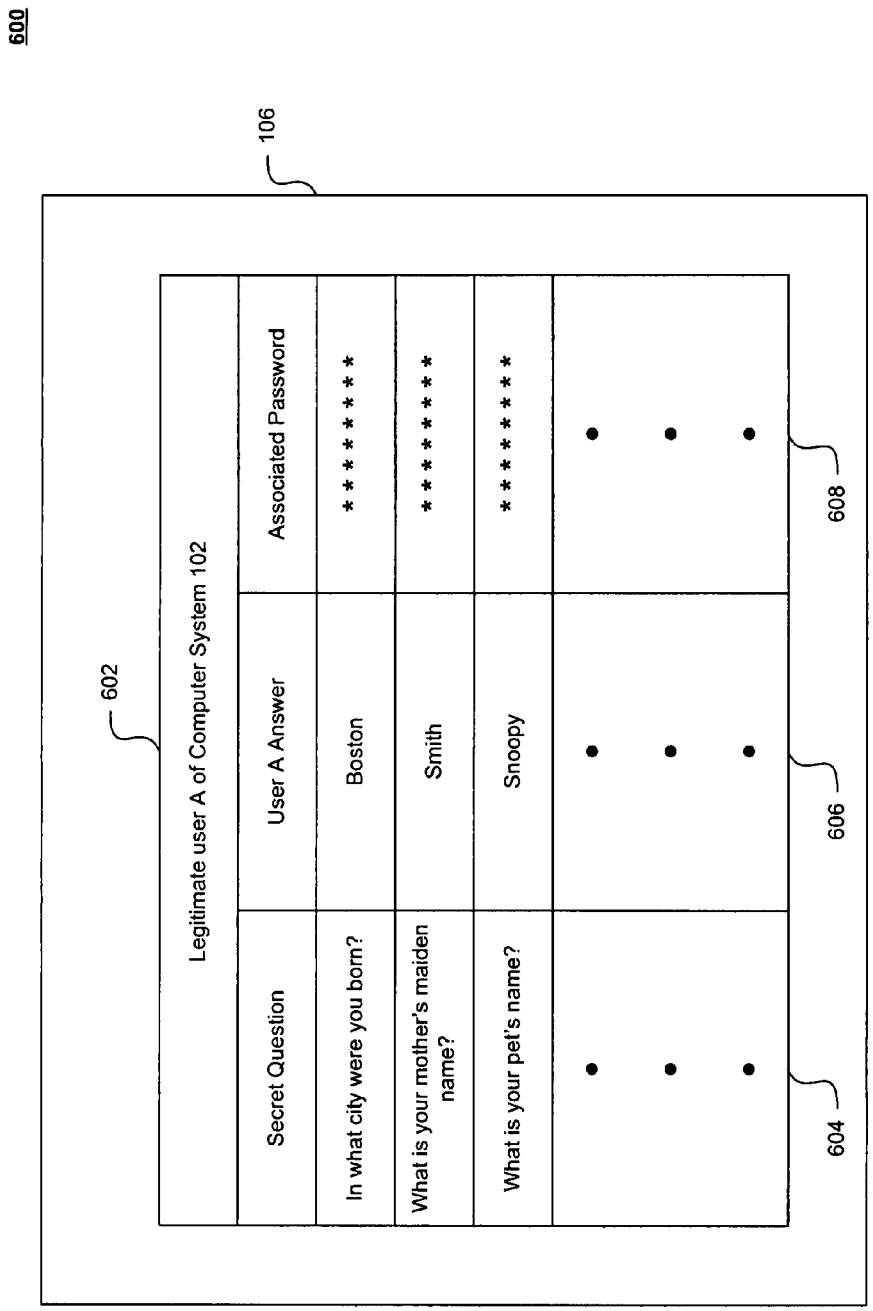
FIG. 6 illustrates an example database that can be used by the system of FIG. 1.

FIG. 6 illustrates an example embodiment 600 of database 106 of the system of FIG. 1. As described above, authentication information associated with a legitimate user of computer system 102 is generated and stored in database 106 when computer system 102 registers with computer access protection system 104. In an embodiment, a legitimate user "A" of computer system 102 enters one or more answers 606 in response to one or more secret questions 604 during the registration process. User "A" further associates one or more passwords 608 with each secret question/answer pair, to generate an authentication table 602. It is noted that secret questions 604 in example embodiment 600 are provided for the purpose of illustration only. Questions of other types and/or content can also be used.

Authentication table 602 is subsequently used to generate a token when computer system 102 moves outside designated area 116. In an embodiment, the token includes a secret question, a corresponding answer, and an associated password from authentication table 602. Selection from authentication table 602 may be performed randomly or, alternatively, based on a current known password of computer system 102 and/or an exit time of computer system 102 from the designated area. For example, if the current known password of computer system 102 is identical or similar to an associated password in table 602, the secret question/answer pair corresponding to the associated password will not be included in the token.

Figure 7:
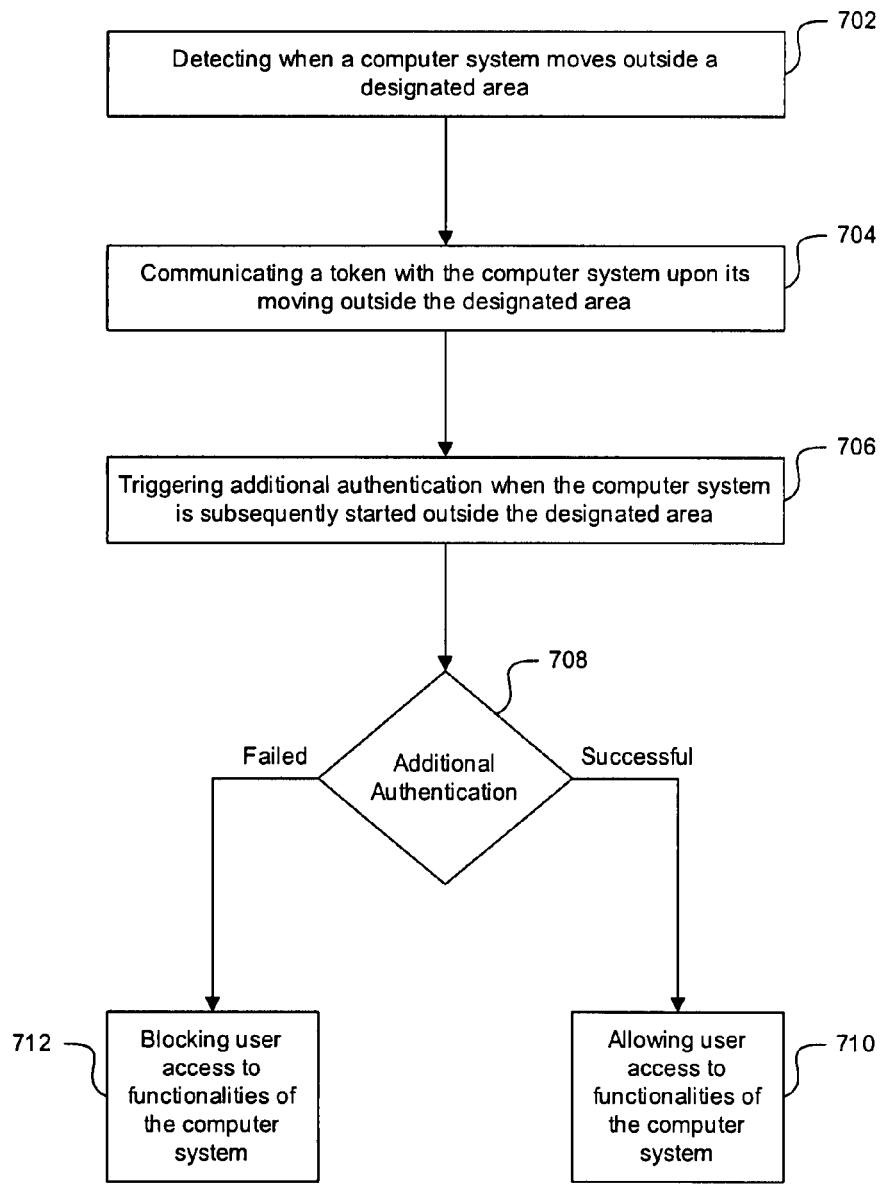
FIG. 7 is a process flowchart of a method for protecting access to information on a computer system.

FIG. 7 is a process flowchart 700 of a method for protecting access to information on a computer system. The computer system has a first level of authentication, which is carried at any time that the computer system is started. Process 700 begins in step 702, which includes detecting when the computer system moves outside a designated area. In an embodiment, step 702 includes detecting when the computer system exits an exit gate of the designated area. For example, step 702 may include detecting when the computer system moves outside a school, office building, multi-building corporate campus, house, hospital, police station, fire station, central office, power plant, or research facility. Step 702 can be performed by a centralized surveillance system.

Step 704 includes communicating a token with the computer system upon its moving outside the designated area. In an embodiment, step 704 is performed using one-way communication to the computer system. Alternatively, step 704 is performed using two-way communication between a computer access protection system and the computer system.

Communication with the computer system includes communicating with radio frequency (RF) communication components integrated within the computer system. In an embodiment, the RF communication components are integrated within a LAN On Motherboard (LOM) network adapter, which is integrated within a motherboard of the computer system. This allows communication with the RF communication components, regardless of the power mode of the computer system (ON, OFF, Standby, Hibernation). The RF communication components may include a wireless radio transceiver, a wireless radio receiver, and/or a Global Positioning System (GPS) receiver.

Step 706 includes triggering additional or a second level of authentication when the computer system is subsequently started outside the designated area. In an embodiment, the additional or second level of authentication is triggered by activation of the token communicated with the computer system in step 704.

In step 708, the additional or second level of authentication is performed by the user of the computer system.

If the additional or second level authentication is successfully performed, step 710 includes allowing user access to functionalities of the computer system. This may include, for example, loading the operating system installed on the computer system.

On the other hand, if the additional or second level of authentication is failed by the user, step 712 includes blocking access to functionalities of the computer system. This may include, for example, blocking access to the operating system, hard drives, and/or external drives associated with the computer system. Under certain access blocking mechanisms, access blocking cannot be bypassed by moving the hard drives of the computer system to another system.

Unlocking of the functionalities may require a return of the computer system to the designated area, docking of the computer system with the computer access protection system 104, and/or other resetting procedures by information technology (IT) personnel.

In another embodiment, the token triggers limited access to certain functionalities within the computer system, regardless of the result of the additional or second level of authentication. For example, functionalities such as printing documents, network access, and access to external drives may be blocked when the computer system moves outside a designated area, regardless that the additional or second level of authentication is successfully performed by the user. This prevents any possible dissemination of information contained on the computer system when the computer system is outside the designated area.

Figure 8:
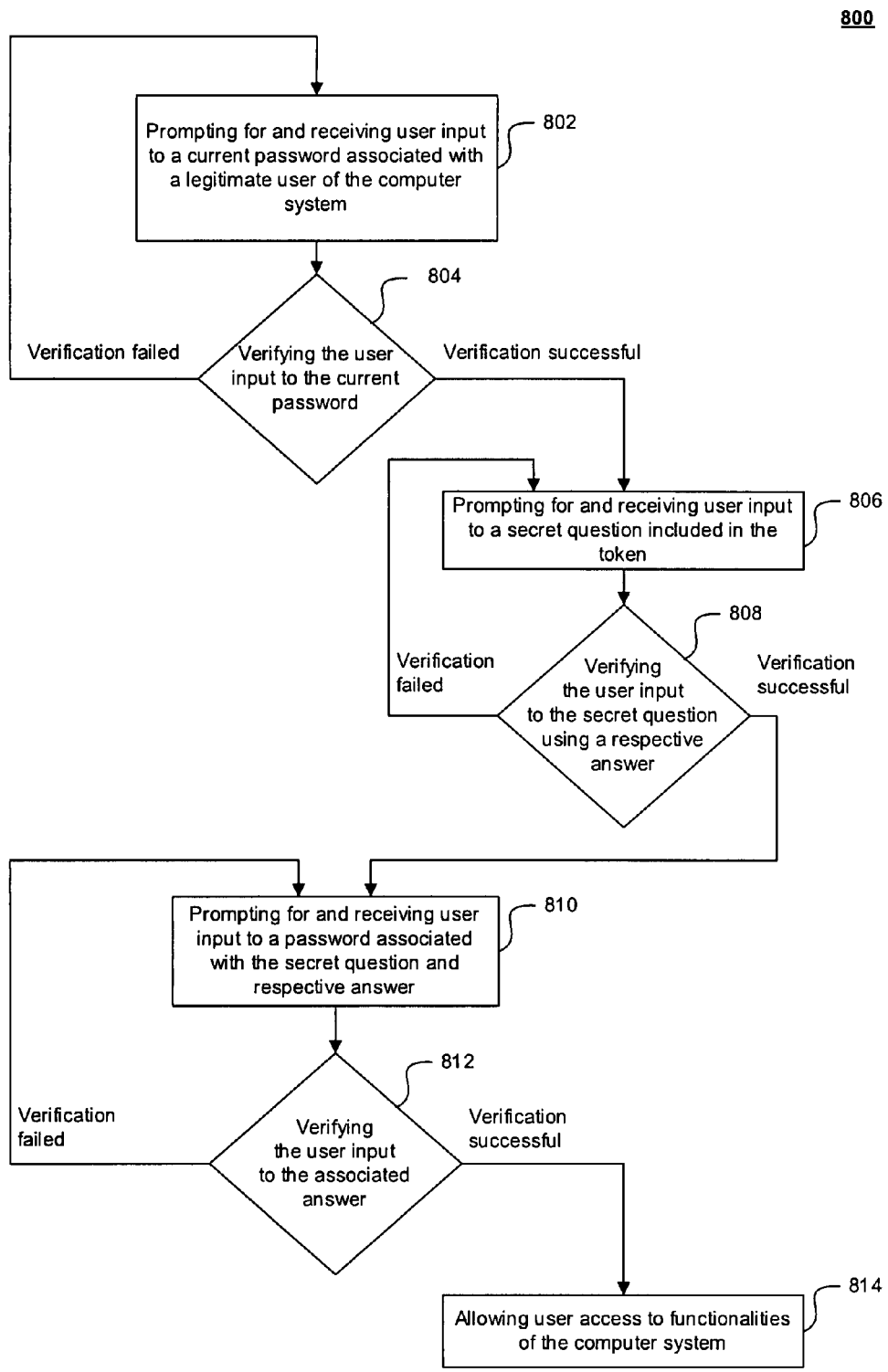
FIG. 8 is a process flowchart of an additional or a second level of authentication process triggered by an information access protection system on a computer system.

FIG. 8 is a process flowchart 800 of the additional or second level of authentication enabled by the method of FIG. 7 upon a start up of the computer system. The additional or second level of authentication is triggered by activation of a token communicated with the computer system.

Process 800 begins in step 802, which includes prompting for and receiving user input to a current password associated with a legitimate user of the computer system.

Step 804 includes verifying the user input to the current password.

If verification fails in step 804, process 800 returns to step 802 to allow the user a second input attempt to the current password.

If verification is successful in step 804, process 800 proceeds to step 806, which includes prompting for and receiving user input to a secret question included in the token.

Step 808 includes verifying the user input to the secret question using a respective answer, also included in the token.

If verification fails in step 808, process 800 returns to step 806 to allow the user a second input attempt to the secret question.

If verification is successful in step 808, process 800 proceeds to step 810, which includes prompting for and receiving user input to a password associated with the secret question and respective answer.

Step 812 includes verifying the user input to the associated password.

If verification fails in step 812, process 800 returns to step 810 to allow the user a second input attempt to the associated password.

If verification is successful in step 812, process 800 proceeds to step 814, which includes allowing user access to functionalities of the computer system.

In process 800, if verification in any of steps 804, 808, and/or 812 is successively failed for a determined number of times (e.g., three times), the additional or second level of authentication process is failed and locking of functionalities will occur. A re-start of the computer system will re-start process 800 in step 802.

EXAMPLE COMPUTER IMPLEMENTATION

Figure 9:
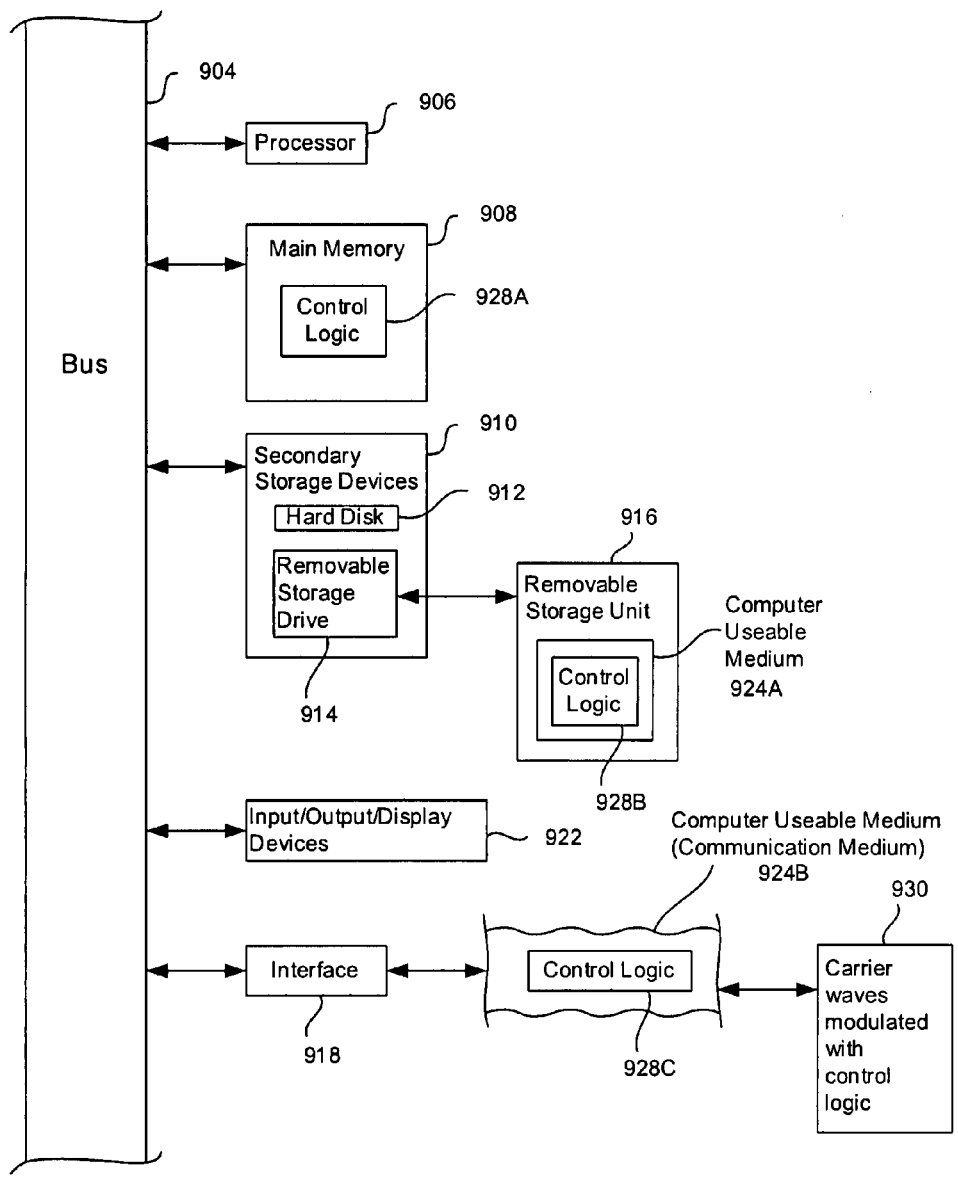
FIG. 9 illustrates an example computer useful for implementing components of the invention.

In an embodiment of the present invention, the system and components of the present invention described herein are implemented using well known computers, such as computer 902 shown in FIG. 9.

The computer 902 can be any commercially available and well known computer capable of performing the functions described herein, such as computers available from International Business Machines, Apple, Sun, HP, Dell, Compaq, Digital, Cray, etc. The computer 902 can be a laptop computer.

The computer 902 includes one or more processors (also called central processing units, or CPUs), such as a processor 906. The processor 906 is connected to a communication bus 904.

The computer 902 also includes a main or primary memory 908, such as random access memory (RAM). The primary memory 908 has stored therein control logic 928A (computer software), and data.

The computer 902 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924 having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well known manner.

The computer 902 also includes input/output/display devices 922, such as monitors, keyboards, pointing devices, etc.

The computer 902 further includes a communication or network interface 918. The network interface 918 enables the computer 902 to communicate with remote devices. For example, the network interface 918 allows the computer 902 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from the computer 902 via the communication medium 924B. More particularly, the computer 902 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 902, the main memory 908, the secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for protecting access to information on a computer system having a first level of authentication, comprising:
   registering, in a database of a computer access protection system, a plurality of answers to a respective plurality of secret questions, wherein said answers are selected by and associated with a legitimate user of said computer system;
   registering, in said database, a plurality of user passwords selected by said legitimate user, wherein each of said passwords is associated with a secret question of the plurality of secret questions and its respective answer;
   detecting, by said computer access protection system, when said computer system moves outside a designated area; and
   communicating, by said computer access protection system, a token to said computer system upon the computer system moving outside the designated area;
   wherein said token includes authentication information associated with said legitimate user obtained from said database and triggers a second level authentication when said computer system is subsequently started outside the designated area, and wherein failure of said second level of authentication results in locking of functionalities within said computer system.

2. The method of claim 1, wherein said communicating step comprises communicating with radio frequency (RF) communication components integrated within said computer system.

3. The method of claim 2, wherein said RF communication components are integrated within a LAN On Motherboard (LOM) network adapter, said adapter integrated within a motherboard of said computer system.

4. The method of claim 2, wherein said communicating step comprises communicating with said RF communication components regardless of a power mode of said computer system at the time of communication.

5. The method of claim 2, wherein said communication components comprise a Global Positioning System (GPS) receiver.

6. The method of claim 1, wherein said detecting step comprises comparing global positioning coordinates of said computer system against a range of global positioning coordinates that defines the designated area.

7. The method of claim 1, wherein said communicating step comprises communicating said token to said computer system when said computer system is within the designated area.

8. The method of claim 7, wherein said token communicated within the designated area is activated when said computer system moves outside the designated area.

9. The method of claim 2, wherein said RF communication components comprise a wireless radio transceiver.

10. The method of claim 1, wherein said detecting step is performed by a centralized surveillance system of said computer access protection system.

11. The method of claim 1, wherein said detecting step comprises detecting a code associated with said computer system.

12. The method of claim 1, wherein said communicating step comprises communicating said token to said computer system when said computer system is outside the designated area.

13. The method of claim 1, wherein said communicating step comprises downloading said token inside the designated area to said computer system and activating the token outside the designated area when said computer system is outside the designated area.

14. The method of claim 1, further comprising:
   generating said token based on one or more of a current password associated with said legitimate user and an exit time of said computer system from the designated area,
   wherein said token includes a secret question from said plurality of secret questions, a respective answer from said plurality of answers, and a password associated with said secret question and answer.

15. The method of claim 14, further comprising upon a starting of said computer system:
   (a) prompting for and receiving user input to said current password associated with said legitimate user;
   (b) verifying said user input to said current password;
   (c) prompting for and receiving user input to said secret question included in said token, if password verification is successful in step (b);
   (d) verifying said user input to said secret question using said respective answer included in said token;
   (e) prompting for and receiving user input to said password associated with said secret question and answer, if verification is successful in step (d); and
   (f) verifying said user input to said associated password; and
   (g) allowing user access to functionalities of said computer system if said verification in step (f) is successful.

16. The method of claim 15, wherein said second level of authentication includes steps (c) through (f).

17. The method of claim 15, further comprising:
   (h) locking of functionalities within said computer system if any of said verifying steps is successively failed for a determined number of times.

18. The method of claim 1, wherein said second level of authentication can be bypassed by docking said computer system to an associated network system within said designated area.

19. The method of claim 1, wherein said locking of functionalities within said computer system includes blocking access to one or more of: an operating system, hard drives, and external drives associated with said computer system.

20. The method of claim 1, wherein said token triggers limited access to certain functionalities within said computer system when said computer system moves outside the designated area, regardless of the result of said second level authentication.

21. The method of claim 20, wherein said certain functionalities include one or more of printing documents, network access, and access to external drives.

22. The method of claim 1, wherein said first level of authentication acts both inside and outside the designated area.

23. A system for protecting access to information on a computer system having a first level of authentication, comprising:
- a centralized surveillance system configured to detect when said computer system moves outside a designated area;
- a database configured to store authentication information associated with a legitimate user of said computer system, wherein said database includes a plurality of answers to a respective plurality of secret questions, said answers selected by and associated with said legitimate user of said computer system; and
- a radio frequency (RF) communication system configured to communicate a token to said computer system upon the computer system moving outside the designated area,
- wherein said token includes authentication information from said database and is configured to trigger a second level of authentication when said computer system is subsequently started outside the designated area.

24. The system of claim 23, further comprising:
a radio frequency (RF) transceiver integrated within a LAN On Motherboard (LOM) network adapter, integrated within a motherboard of said computer system.

25. The system of claim 23, further comprising:
a Global Positioning System (GPS) receiver integrated within said computer system, wherein said GPS receiver is configured to generate position coordinates of said computer system and download said token if said computer system is outside said designated area.

26. The system of claim 23, wherein said database further includes a plurality of user passwords selected by said legitimate user, and wherein each of said passwords is associated with a secret question of the plurality of secret questions and its respective answer.

27. The system of claim 23, wherein said centralized surveillance system comprises:
- a detector configured to generate detection signals when said computer system moves outside the designated area; and
- a controller coupled to said detector and configured to receive said detection signals from said detector.

28. The system of claim 27, wherein said controller is further configured to communicate with said database and to retrieve authentication information associate with said computer system.

29. The system of claim 27, wherein said controller is further configured to control said RF communication system to communicate with said computer system.

30. A method for protecting access to information on a computer system having a first level of authentication, comprising:
- detecting, by a computer access protection system, when said computer system moves outside a designated area;
- generating a token by said computer access protection system, wherein said token includes a secret question, an answer to the secret question, and a password, the secret question, answer, and password selected by and associated with a legitimate user of said computer system;
- communicating the token, by said computer access protection system, to said computer system upon the computer system moving outside the designated area,
- wherein said token triggers a second level authentication when said computer system is subsequently started outside the designated area, and wherein failure of said second level of authentication results in locking of functionalities within said computer system.

* * * * *